United States Patent
Kato et al.

(10) Patent No.: US 12,221,063 B2
(45) Date of Patent: Feb. 11, 2025

(54) IN-VEHICLE ELECTRONIC SYSTEM, VEHICLE, CONTROL METHOD, AND COMPUTER READABLE STORAGE MEDIUM

(71) Applicant: HONDA MOTOR CO.,LTD., Tokyo (JP)

(72) Inventors: Hisahiro Kato, Tokyo (JP); Satoshi Kono, Tokyo (JP); Kanako Saito, Tokyo (JP); Yusuke Takahashi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 388 days.

(21) Appl. No.: 17/680,328

(22) Filed: Feb. 25, 2022

(65) Prior Publication Data

US 2022/0314930 A1    Oct. 6, 2022

(30) Foreign Application Priority Data

Mar. 30, 2021    (JP) .................................. 2021-057654

(51) Int. Cl.
*B60R 25/104*    (2013.01)
*B60R 25/10*    (2013.01)

(52) U.S. Cl.
CPC ........ *B60R 25/104* (2013.01); *B60R 25/1001* (2013.01); *B60R 25/1009* (2013.01)

(58) Field of Classification Search
CPC .............. B60R 25/104; B60R 25/1001; B60R 25/1009; B60R 16/0232; G07C 9/00896; H04L 67/12
See application file for complete search history.

(56) References Cited

U.S. PATENT DOCUMENTS

| 4,218,763 | A | | 8/1980 | Brailsford |
| 5,612,669 | A | * | 3/1997 | Allen ................... B60R 25/104 340/529 |
| 8,848,608 | B1 | * | 9/2014 | Addepalli ............... H04W 8/26 370/401 |

(Continued)

FOREIGN PATENT DOCUMENTS

| JP | 2003212093 A | | 7/2003 |
| JP | 2007046342 A | * | 2/2007 |

(Continued)

OTHER PUBLICATIONS

Office Action issued for counterpart Japanese Application No. 2021-057654, transmitted from the Japanese Patent Office on May 7, 2024 (drafted on Apr. 26, 2024).

*Primary Examiner* — Nay Tun

(57) ABSTRACT

An in-vehicle electronic system is mounted to a vehicle. The in-vehicle electronic system includes one or more sensors used to determine a security state of the vehicle, an alarm apparatus configured to issue an alarm when the security state is abnormal, and a first ECU directly connected to the sensor and the alarm apparatus without the intermediation of another ECU and also connected to a plurality of other ECUs, in which the first ECU includes a processor configured to determine a security state based on at least information received from the sensor, and cause the alarm apparatus to operate when it is determined that the security state is abnormal.

16 Claims, 4 Drawing Sheets

(56) References Cited

U.S. PATENT DOCUMENTS

| | | | |
|---|---|---|---|
| 9,021,075 B2* | 4/2015 | Rocher | H04L 12/40039 701/1 |
| 2003/0009271 A1* | 1/2003 | Akiyama | H04L 69/329 701/29.6 |
| 2003/0137409 A1* | 7/2003 | Kikkawa | B60R 25/33 340/426.11 |
| 2005/0273219 A1* | 12/2005 | Kitao | B60R 25/00 701/2 |
| 2010/0312417 A1 | 12/2010 | Wakabayashi | |
| 2011/0046844 A1* | 2/2011 | Honner | H04L 12/462 701/31.4 |
| 2013/0031212 A1* | 1/2013 | Enosaki | H04L 69/28 709/218 |
| 2015/0020152 A1* | 1/2015 | Litichever | H04L 63/08 726/1 |
| 2015/0131477 A1* | 5/2015 | Balbierer | H04L 12/12 370/254 |
| 2016/0381068 A1* | 12/2016 | Galula | G07C 5/0816 726/23 |
| 2017/0088072 A1* | 3/2017 | Curtis | G08B 31/00 |
| 2019/0143965 A1* | 5/2019 | Driscoll | G05D 1/0022 701/41 |
| 2019/0238555 A1* | 8/2019 | Buffard | H04L 63/0823 |
| 2020/0217942 A1* | 7/2020 | Asmar | E05F 15/695 |
| 2020/0290567 A1* | 9/2020 | Funyak | B60R 25/102 |
| 2020/0403823 A1* | 12/2020 | van Dijk | H04L 12/40176 |
| 2022/0001835 A1* | 1/2022 | Kim | B60R 25/00 |
| 2022/0141701 A1 | 5/2022 | Tsushima | |
| 2022/0173902 A1* | 6/2022 | Gao | H04L 65/1069 |
| 2022/0179636 A1* | 6/2022 | Barry | B60R 16/023 |

FOREIGN PATENT DOCUMENTS

| | | | |
|---|---|---|---|
| JP | 2013036326 A | | 2/2013 |
| JP | 2013043512 A | * | 3/2013 |
| JP | 5502372 B2 | | 5/2014 |
| JP | 2014166811 A | | 9/2014 |
| JP | 2020111283 A | | 7/2020 |
| JP | 2021033823 A | | 3/2021 |
| JP | 2022072257 A | | 5/2022 |

* cited by examiner

IN-VEHICLE ELECTRONIC SYSTEM, VEHICLE, CONTROL METHOD, AND COMPUTER READABLE STORAGE MEDIUM

The contents of the following Japanese patent application(s) are incorporated herein by reference: NO. 2021-057654 filed in JP on Mar. 30, 2021

BACKGROUND

1. Technical Field

The present invention relates to an in-vehicle electronic system, a vehicle, a control method, and a computer readable storage medium.

2. Related Art

Patent document 1 describes an in-vehicle electronic system with which power consumption at the time of standby can be suppressed to a low level.
Patent document 1: Specification of Japanese Patent No. 5502372

DESCRIPTION OF EXEMPLARY EMBODIMENTS

Hereinafter, the present invention will be described by way of embodiments of the invention, but the following embodiments are not intended to restrict the invention according to the claims. In addition, not all combinations of features described in the embodiments necessarily have to be essential to solving means of the invention.

Figure 1:
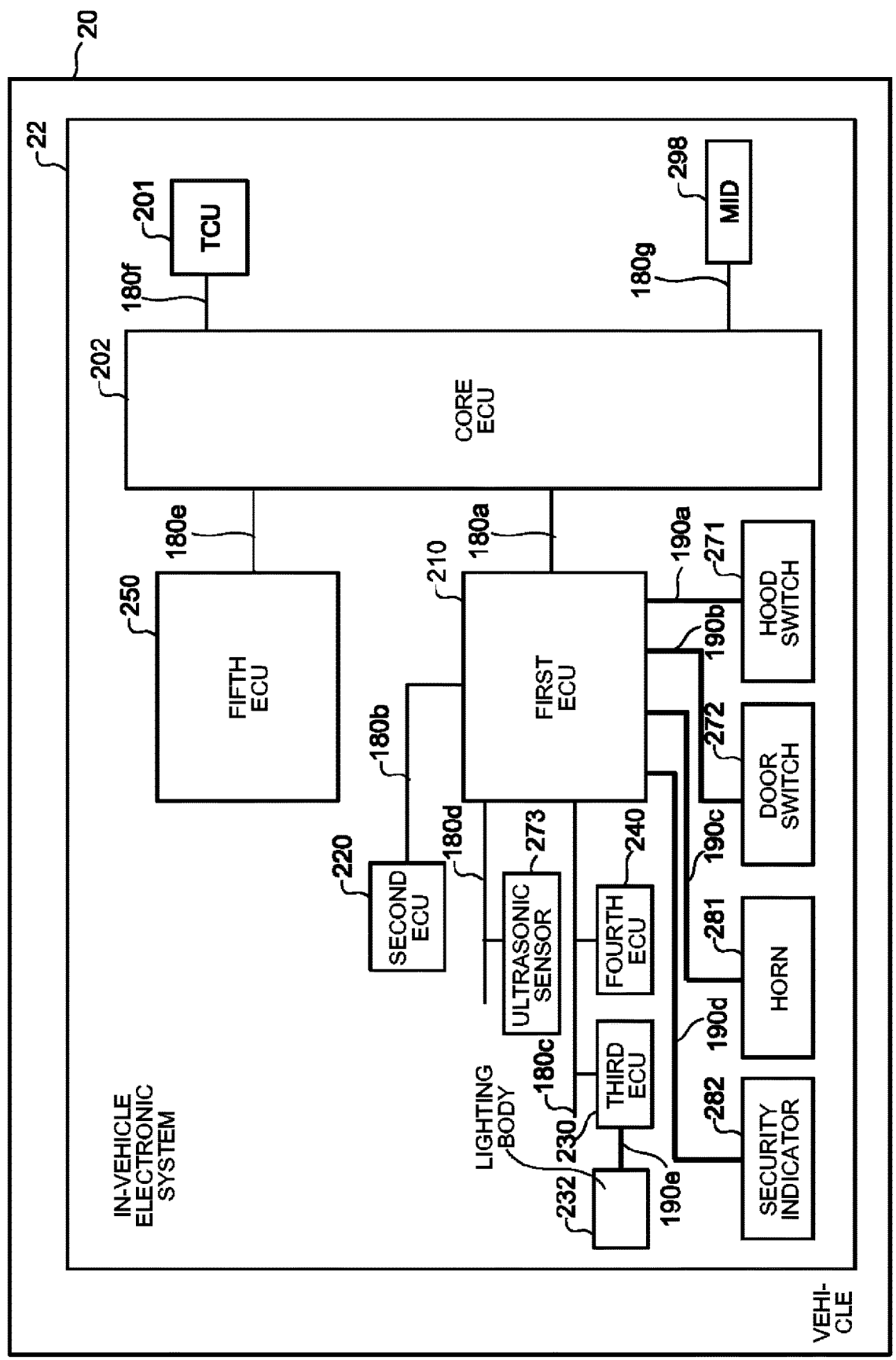
FIG. 1 schematically illustrates a system configuration of a vehicle 20 according to one embodiment.

FIG. 1 schematically illustrates a system configuration of a vehicle 20 according to one embodiment. The vehicle 20 includes an in-vehicle electronic system 22. The in-vehicle electronic system 22 includes a TCU 201, a core ECU 202, a first ECU 210, a second ECU 220, a third ECU 230, a fourth ECU 240, a fifth ECU 250, a hood switch 271, a door switch 272, an ultrasonic sensor 273, a horn 281, a security indicator 282, and an MID 298. It should be noted that FIG. 1 illustrates a configuration in which the vehicle 20 includes the in-vehicle electronic system 22, but the configuration of the vehicle 20 is not limited to an example of the present embodiment.

The core ECU 202, the first ECU 210, the second ECU 220, the third ECU 230, the fourth ECU 240, and the fifth ECU 250 are an electronic control unit configured to control in-vehicle devices. Each of the ECUs of the core ECU 202, the first ECU 210, the second ECU 220, the third ECU 230, the fourth ECU 240, and the fifth ECU 250 may be configured by including a computer including a processor, a volatile memory, and a nonvolatile memory. The TCU 201 is a telematics control unit. The TCU 201 is responsible for wireless communication with the outside of the vehicle 20. For example, the TCU 201 is responsible for wireless communication through a mobile network or wireless LAN communication.

The core ECU 202 is connected to the first ECU 210 via a communication network 180a. The core ECU 202 and the first ECU 210 are mutually communicable through the communication network 180a. The core ECU 202 is connected to the fifth ECU 250 via a communication network 180e. The core ECU 202 and the fifth ECU 250 are mutually communicable through the communication network 180e. The core ECU 202 is connected to the TCU 201 via a communication network 180f. The core ECU 202 and the TCU 201 are mutually communicable through the communication network 180f. The core ECU 202 is connected to the MID 298 via the communication network 180f. The core ECU 202 and the MID 298 are mutually communicable through a communication network 180g.

The first ECU 210 is connected to the second ECU 220 via the communication network 180a. The core ECU 202 and the second ECU 220 are mutually communicable through a communication network 180b. The first ECU 210 is connected to the third ECU 230 and the fourth ECU 240 via a communication network 180c. The first ECU 210, the second ECU 220, and the third ECU 230 are mutually communicable through the communication network 180b. The first ECU 210 is connected to the ultrasonic sensor 273 via a communication network 180d. The first ECU 210 and the ultrasonic sensor 273 are mutually communicable through the communication network 180d. It should be noted that the fourth ECU 240 is an ECU responsible for an electric steering lock function. The fifth ECU 250 is, for example, an ECU configured to control ECUs in an overall manner which are configured to perform control mainly related to driving control of the vehicle 20 such as a fuel injection apparatus. Functions of other ECUs will be described below.

The communication network 180a, the communication network 180b, the communication network 180c, and the communication network 180e are a controller area network (CAN) communication network. The communication network 180d may be a serial communication line such as a universal asynchronous receiver transmitter (UART) or a communication line compliant with a local interconnect network (LIN). The communication network 180f may include a communication network compliant with Ethernet (registered trademark) and a controller area network (CAN) communication network.

The hood switch 271, the door switch 272, the horn 281, and the security indicator 282 are connected to the first ECU 210. The hood switch 271 is connected to the first ECU 210 via a direct connection line 190a. The first ECU 210 acquires an output of the hood switch 271 through the direct connection line 190a. The door switch 272 is connected to the first ECU 210 via a direct connection line 190b. The first ECU 210 acquires an output of the door switch 272 through the direct connection line 190b. The horn 281 is connected to the first ECU 210 via a direct connection line 190c. The first ECU 210 outputs a driving signal for operating the horn 281 through the direct connection line 190c. The security indicator 282 is connected to the first ECU 210 via the direct connection line 190d. The first ECU 210 outputs a driving signal for operating the security indicator 282 through the direct connection line 190d. In addition, a lighting body 232 is connected to the third ECU 230. The lighting body 232 is connected to the third ECU 230 via a direct connection line 190*e*. The third ECU 230 outputs a driving signal for operating the lighting body 232 through the direct connection line 190*a*. The direct connection line 190*a*, the direct connection line 190*b*, the direct connection line 190*c*, the direct connection line 190*d*, and the direct connection line 190*e* are not data communication lines for serial communication or the like but are mutually directly connected signal lines. The direct connection line 190*a*, the direct connection line 190*b*, the direct connection line 190*c*, the direct connection line 190*d*, and the direct connection line 190*e* may be a signal line through which an analog signal is transmitted.

Figure 2:
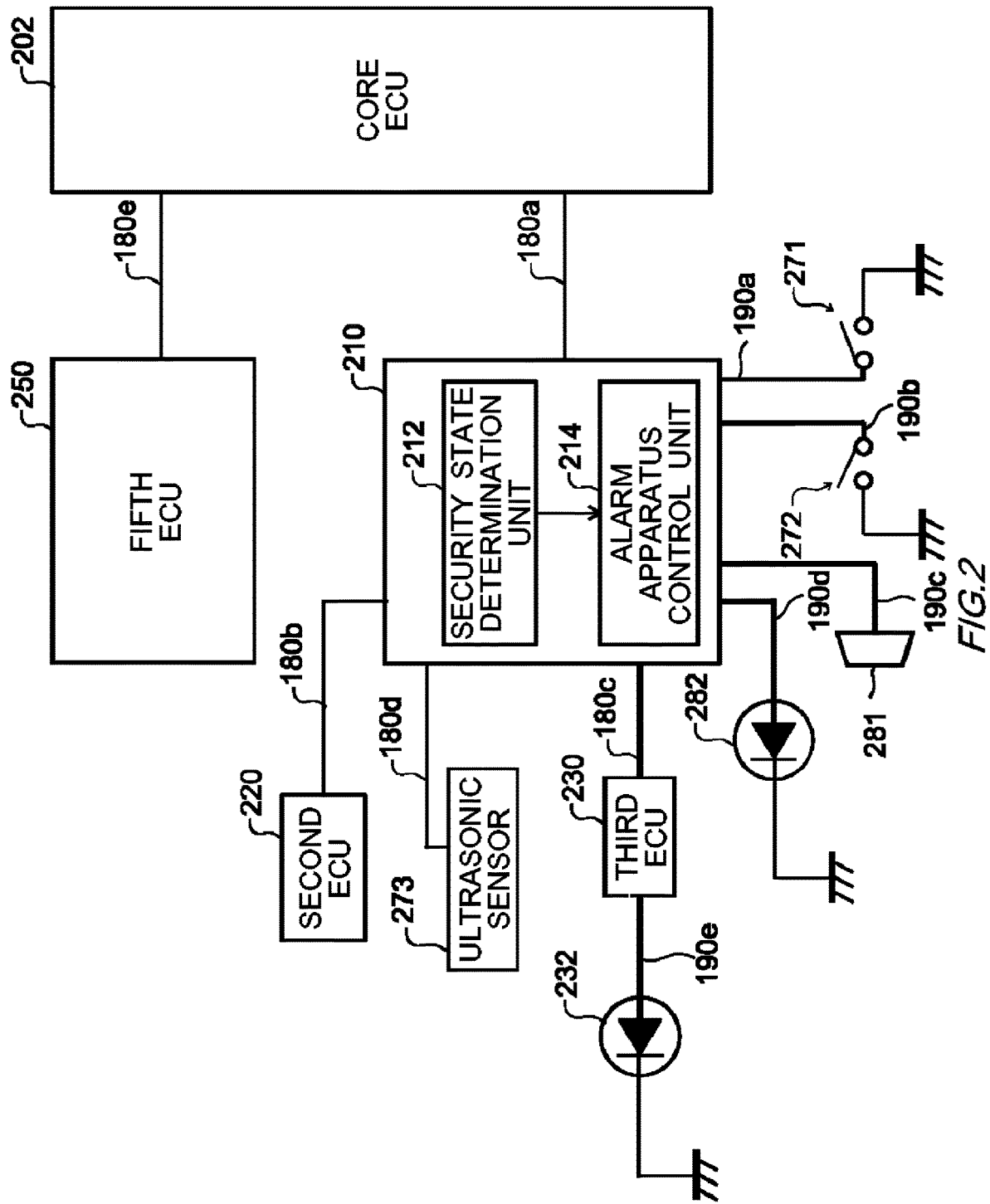
FIG. 2 illustrates a functional configuration of a first ECU 210.

FIG. 2 illustrates a functional configuration of the first ECU 210 together with the core ECU 202, the third ECU 230, the fifth ECU 250, the hood switch 271, the door switch 272, the ultrasonic sensor 273, the horn 281, the security indicator 282, and the lighting body 232.

With regard to the hood switch 271, for example, when an engine hood is opened, a contact point of the hood switch 271 is closed, and when the engine hood is closed, the contact point of the hood switch 271 is opened. With this configuration, an L level signal indicating a hood open state is input to the first ECU 210 when the hood is open, and an H level signal indicating a hood closed state is input to the first ECU 210 when the hood is closed. With regard to the door switch 272, for example, when a door is opened, a contact point of the door switch 272 is closed, and when the door is closed, the contact point of the door switch 272 is opened. With this configuration, an L level signal indicating a door open state is input to the first ECU 210 when the door is open, and an H level signal indicating a door closed state is input to the first ECU 210 when the door is closed. The ultrasonic sensor 273 is provided in the vehicle 20, and configured to detect a reflected wave of an emitted ultrasonic wave.

The horn 281 is a security alarm configured to emit an alarm sound. The horn 281 is directly controlled by the first ECU 210. The horn 281 and an alarming device may be commonly used. The security indicator 282 includes an LED provided in an indicator. The security indicator 282 is directly controlled by the first ECU 210. The lighting body 232 is an emergency flashing indicating light, and is a lighting body used as a so called hazard flasher. The first ECU 210 operates lighting of the lighting body 232 through the third ECU 230.

The hood switch 271, the door switch 272, and the ultrasonic sensor 273 are one example of one or more sensors used to determine a security state of the vehicle 20. The horn 281 and the security indicator 282 are one example of an alarm apparatus configured to issue an alarm when the security state is abnormal.

The first ECU 210 is directly connected to the hood switch 271, the door switch 272, the ultrasonic sensor 273, the horn 281, and the security indicator 282 without the intermediation of another ECU, and is also connected to a plurality of other ECUs. The first ECU 210 includes a security state determination unit 212 and an alarm apparatus control unit 214. With regard to the security state determination unit 212, the first ECU 210 determines the security state based on at least information received from the sensor. The alarm apparatus control unit 214 operates at least one of the horn 281 and the security indicator 282 when the security state determination unit 212 determines that the security state is abnormal.

In this manner, since the first ECU 210 is directly connected to the hood switch 271 and the door switch 272 as well as the alarm apparatus without the intermediation of the other ECU, responsiveness of the alarm can be increased. In addition, even when the core ECU 202, the fifth ECU 250, or the like is not operating, the first ECU 210 can acquire signals output from the hood switch 271 and the door switch 272, and operate the alarm apparatus. For this reason, when an ignition power source of the vehicle 20 is off, the first ECU 210 periodically turns on to monitor the outputs of the hood switch 271 and the door switch 272 without operating the core ECU 202, the fifth ECU 250, or the like, so that abnormality of the security state can be detected. For this reason, a standby current required for antitheft monitoring when the ignition power source is off can be reduced. In addition, since antitheft functions are aggregated in the first ECU 210, the number of ECUs for the antitheft purpose can be reduced. For this reason, costs to acquire a certification for UN R116 (concerted regulation related to an antitheft apparatus) or the like can also be reduced.

The second ECU 220 is directly connected to the first ECU 210 without the intermediation of another ECU, and receives a locking signal and an unlocking signal based on an owner authentication result for the vehicle 20. The second ECU 220 is, for example, a keyless entry ECU. For example, when a code transmitted using a wireless signal from a key is received, and the received code and a previously stored code are matched with each other, the second ECU 220 generates an authentication result indicating that a key authentication is attained. The first ECU 210 determines the security state further based on information received from the second ECU 220. For example, in a case where the authentication result indicating that the key authentication is attained is not acquired by the second ECU 220, the first ECU 210 determines the abnormality of the security state when a predetermined signal is sensed by at least any of the hood switch 271, the door switch 272, and the ultrasonic sensor 273.

In this manner, the second ECU 220 is directly connected to the first ECU 210 without the intermediation of the other ECU. For this reason, the first ECU 210 can receive the signal such as the authentication result from the second ECU 220 without operating the other ECU. For this reason, the standby current when the ignition power source is off can be reduced. In addition, since the ECU configured to receive the signal from the outside can be separated from the first ECU 210, the security can be improved.

The third ECU 230 is connected to the first ECU 210, and configured to control the lighting body 232. When the security state determination unit 212 determines that the security state is abnormal, the alarm apparatus control unit 214 transmits a hazard output request to the third ECU 230. The third ECU 230 turns on in response to the hazard output request, and also controls the lighting body 232. In this manner, when the first ECU 210 outputs the hazard output request to the third ECU 230 in a case where it is determined that the security state is abnormal, the third ECU 230 turns on and also controls the lighting body 232, so that responsiveness of the lighting body 232 can be improved as compared with a case where processing is performed for retransmitting the signal detected by the hood switch 271 or the door switch 272 to the ECU that has been caused to turn on.

When the security state determination unit 212 determines that the security state is abnormal, the alarm apparatus control unit 214 causes the horn 281 and the lighting body 232 to alternately operate by alternately performing output of a signal for causing the horn 281 to operate and transmission of the hazard output request to the third ECU 230.

The core ECU 202 has a gateway function for relaying data communication between a plurality of slave ECUs and data communication between the plurality of slave ECUs and an apparatus outside the vehicle. Herein, the plurality of slave ECUs are, for example, the first ECU 210, the fifth ECU 250, and the like. The core ECU 202 may be referred to as a "central ECU", a "master ECU", or the like. The slave ECUs such as the first ECU 210 and the fifth ECU 250 perform the data communication with the apparatus outside the vehicle via the TCU 201 through the gateway function of the ECU 202. The first ECU 210 is an ECU that is provided between the plurality of ECUs and the core ECU 202 and includes a gateway function for relaying communication between the plurality of ECUs such as the second ECU 220, the third ECU 230, and the fourth ECU 240 and the core ECU. In this manner, when a configuration is adopted where the second ECU 220, the third ECU 230, and the fourth ECU 240 are connected to the first ECU 210 but are not directly connected to the ECU 202, reliability of cyber security can be enhanced.

Figure 3:
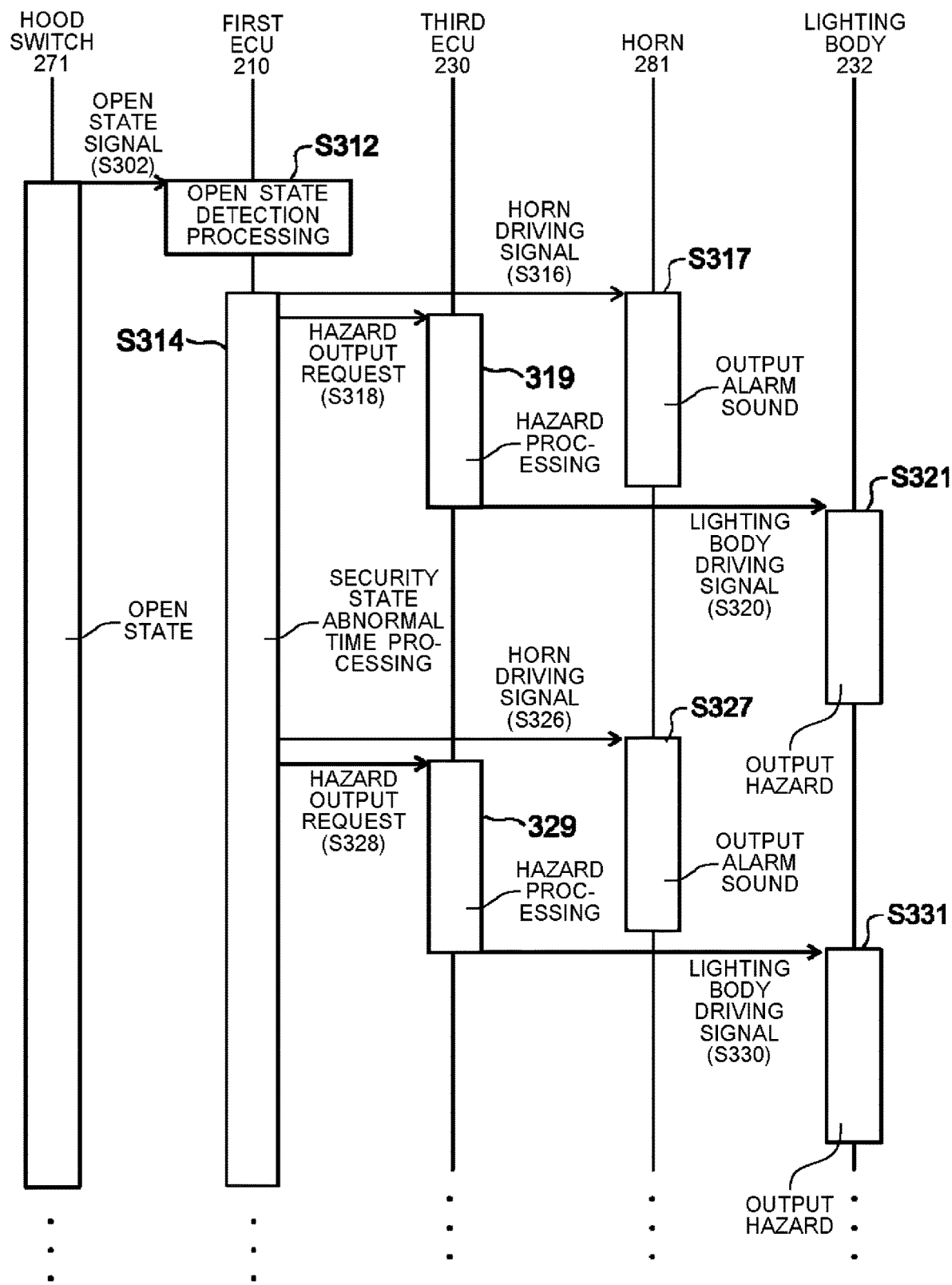
FIG. 3 is a sequence diagram illustrating an execution procedure of processing executed by the first ECU 210 and a third ECU 230 when an engine hood of the vehicle 20 is opened.

FIG. 3 is a sequence diagram illustrating an execution procedure of processing executed by the first ECU 210 and the third ECU 230 when the engine hood of the vehicle 20 is opened. It should be noted that before this sequence is started, the ignition power source is in an off state. In addition, it is a state in which the key authentication is not attained by the second ECU 220.

In S302, when the hood switch 271 is opened, a signal indicating the hood open state is output to the first ECU 210. When the first ECU 210 periodically turns on, in S312, the security state determination unit 212 performs processing of detecting whether the hood is in the open state. When the signal output from the hood switch 271 is the signal indicating the hood open state and the authentication result indicating that the key authentication is attained is not received from the second ECU 220, it is determined that the security state is abnormal, and the alarm apparatus control unit 214 starts security state abnormal time processing (S314).

When the alarm apparatus control unit 214 outputs a horn driving signal for operating the horn 281 to the horn 281 through the direct connection line 190c as the security state abnormal time processing (S316), the horn 281 outputs the alarm sound (S317). Subsequently, in S318, the alarm apparatus control unit 214 transmits the hazard output request to the third ECU 230 through the communication network 180c. The third ECU 230 turns on in response to the hazard output request and also performs hazard processing (S319), and outputs a lighting body driving signal of a predetermined pattern to the lighting body 232 through the direct connection line 190e in S320 to cause the lighting body 232 to emit light according to the predetermined pattern (S321).

Following that, similarly as in the sequence of S316 to S321, the alarm apparatus control unit 214 outputs the horn driving signal to the horn 281 through the direct connection line 190c (S326), so that the horn 281 outputs the alarm sound (S327). Subsequently, in S328, the alarm apparatus control unit 214 transmits the hazard output request to the third ECU 230 through the communication network 180c, and the third ECU 230 performs the hazard processing in response to the hazard output request (S329), and outputs the lighting body driving signal of the predetermined pattern to the lighting body 232 through the direct connection line 190e in S330 to cause the lighting body 232 to emit light according to the predetermined pattern (S331). After that, the alarm apparatus control unit 214 alternately executes the sequence of S316 to S321 and the sequence of S326 to S331 to repeat the alarm sound output and the hazard output. Since the horn 281 and the third ECU 230 are directly connected to the first ECU 210 without the intermediation of the other ECU, occurrence of a response delay of the alarm sound output and the hazard output is suppressed, so that the alarm sound output and the hazard output can be repeated, and antitheft performance is improved.

As described above, in accordance with the in-vehicle electronic system 22, since the security related functions are aggregated to the first ECU 210 and the ECUs directly connected to the first ECU 210, the responsiveness of the alarm can be enhanced. In addition, since the abnormality of the security state can be detected without operating the core ECU 202, the fifth ECU 250, or the like when the ignition power source is off, the standby current required to monitor the security state when the ignition power source is off can be reduced. In addition, since the security related functions are aggregated to the first ECU 210, the number of ECUs required to operate to perform the security related processing can be reduced. For this reason, for example, the costs to acquire the certification for UN R116 (concerted regulation related to the antitheft apparatus) or the like can also be reduced.

The vehicle 20 is a vehicle as one example of a transport device. The vehicle may be a motor vehicle such as a motor vehicle including an internal combustion engine, an electric motor vehicle, or a fuel cell motor vehicle (FCV). The motor vehicle includes a bus, a truck, a two-wheel motor vehicle, or the like. The vehicle may be a saddle type vehicle or the like, or may be a motor bike. Examples of the transport device include, in addition to the vehicle, a device such as an airplane including an unmanned airplane, or a vessel. The transport device may be any device configured to transport a person or an article. The transport device is one example of a movable object. The movable object is not limited to the transport device, and may be any movable device.

Figure 4:
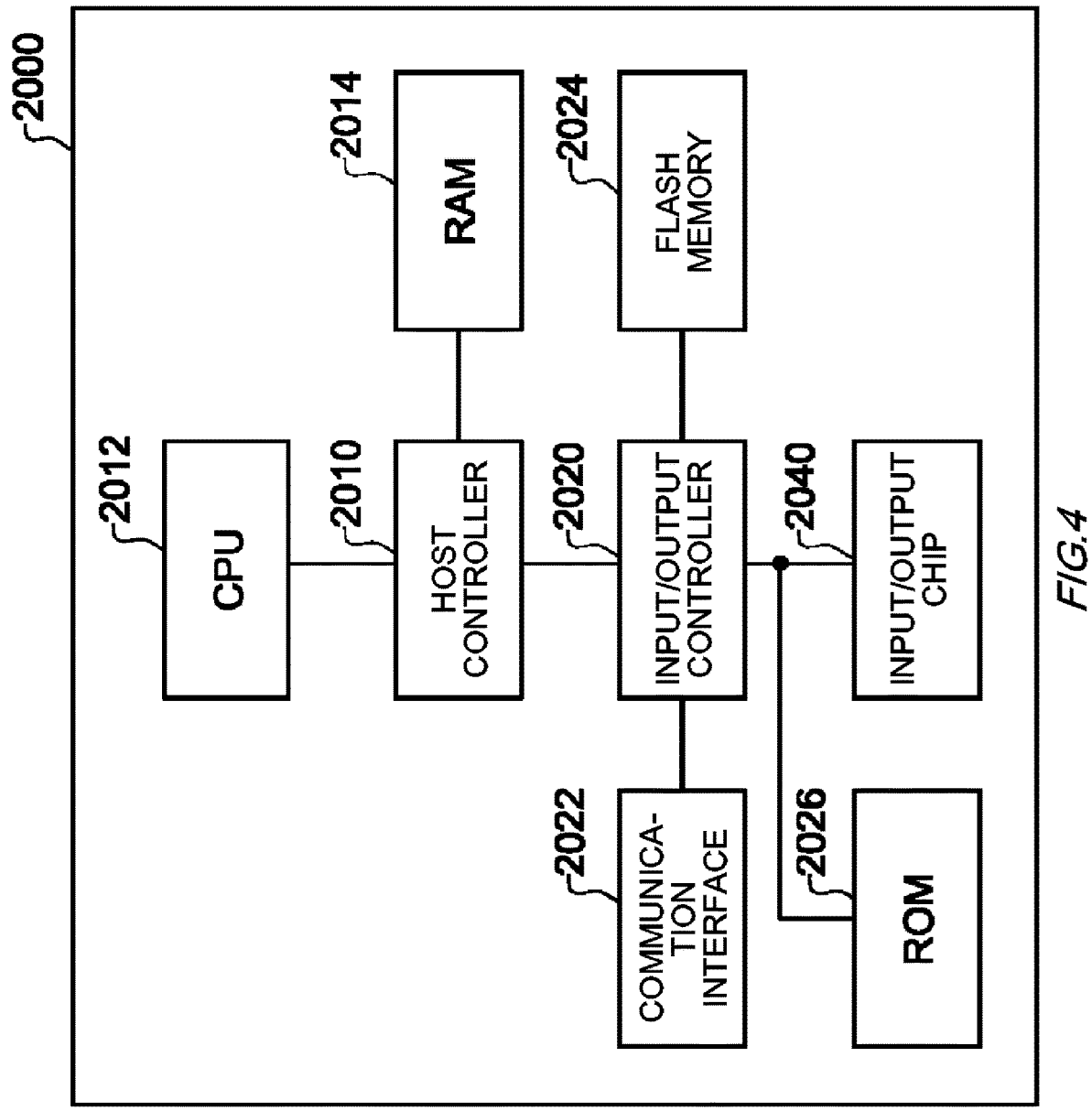
FIG. 4 illustrates an example of a computer 2000 in which a plurality of embodiments of the present invention may be entirely or partially embodied.

FIG. 4 illustrates an example of a computer 2000 where a plurality of embodiments of the present invention may be entirely or partially embodied. A program installed on the computer 2000 can cause the computer 2000 to function as a system such as the in-vehicle electronic system according to the embodiments or each unit of the system or an apparatus such as the information processing apparatus or each unit of the apparatus, to perform operations associated with the system or each unit of the system or the apparatus or each unit of the apparatus, and/or to perform the process according to the embodiments or steps of the process. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores programs and data used by the CPU 2012 in the computer 2000. The ROM 2026 stores a boot program or the like that is executed by the computer 2000 during activation, and/or a program that depends on hardware of the computer 2000. In addition, the input/output chip 2040 may connect various input/output units such as a keyboard, a mouse, and a monitor to the input/output controller 2020 via an input/output port such as a serial port, a parallel port, a keyboard port, a mouse port, a monitor port, a USB port, an HDMI (registered trademark) port.

A program is provided via a computer readable storage medium such as a CD-ROM, a DVD-ROM, or a memory card, or a network. The RAM 2014, the ROM 2026, or the flash memory 2024 is an example of the computer readable storage medium. The program is installed in the flash memory 2024, the RAM 2014, or the ROM 2026, and is executed by the CPU 2012. Information processing written in these programs is read by the computer 2000, resulting in cooperation between a program and the above mentioned various types of hardware resources. An apparatus or a method may be configured by implementing operations or processing of information according to a use of the computer 2000.

For example, when communication is performed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and perform various types of processing on the data on the RAM 2014. The CPU 2012 then writes back the processed data into the recording medium.

Various types of information such as various types of programs, data, a table, and a database may be stored in the recording medium and may be subjected to information processing. The CPU 2012 may execute, on the data read from the RAM 2014, various types of processing including various types of operations, information processing, conditional judgement, conditional branching, unconditional branching, information retrieval and replacement, or the like described herein and specified by instruction sequences of the programs, and write back a result into the RAM 2014. In addition, the CPU 2012 may search for information in a file, a database, or the like in the recording medium. For example, when the recording medium stores a plurality of entries, each having an attribute value of a first attribute associated with an attribute value of a second attribute, the CPU 2012 may search for an entry having a designated attribute value of the first attribute that matches a condition from the plurality of entries, and read the attribute value of the second attribute stored in the entry, thereby obtaining the attribute value of the second attribute associated with the first attribute that satisfies a predetermined condition.

A program or a software module described above may be stored in a computer readable storage medium on the computer 2000 or in proximity to the computer 2000. A recording medium such as a hard disk or a RAM provided in a server system connected to a dedicated communication network or the Internet can be used as a computer readable storage medium. The program stored in the computer readable storage medium may be provided to the computer 2000 via the network.

The program installed on the computer 2000 and causes the computer 2000 to function as the first ECU 210 may work on the CPU 2012 or the like to cause the computer 2000 to function as each unit of the first ECU 210, respectively. Information processing written in these programs is read by the computer 2000, thereby functioning as each unit of the first ECU 210 which is specific means in which software and various hardware resources described above cooperate with each other. By implementing operations or processing of information according to the intended use of the computer 2000 according to the present embodiment using these specific means, the first ECU 210 specific to the intended use is constructed.

Various embodiments have been described with reference to the block diagrams and the like. In the block diagrams, each block may represent (1) a step of a process in which an operation is executed, or (2) each unit of the apparatus having a role in executing the operation. Specific steps and each unit may be implemented by a dedicated circuit, a programmable circuit supplied along with a computer readable instruction stored on a computer readable storage medium, and/or a processor supplied along with the computer readable instruction stored on the computer readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and other logical operations, and a memory element such as a flip-flop, a register, a field programmable gate array (FPGA), a programmable logic array (PLA), or the like.

The computer readable storage medium may include any tangible device capable of storing an instruction executed by an appropriate device, and as a result, the computer readable storage medium having the instruction stored thereon constitutes at least a part of a product including an instruction that may be executed in order to provide means to execute an operation specified by a processing procedure or a block diagram. Examples of computer readable storage media may include an electronic storage medium, a magnetic storage medium, an optical storage medium, an electromagnetic storage medium, a semiconductor storage medium, etc. More specific examples of the computer readable storage medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, and the like.

The computer readable instruction may include: an assembler instruction, an instruction-set-architecture (ISA) instruction; a machine instruction; a machine dependent instruction; a microcode; a firmware instruction; state-setting data; or either a source code or an object code described in any combination of one or more programming languages, including an object oriented programming language such as Smalltalk (registered trademark), JAVA (registered trademark), C++, or the like; and a conventional procedural programming language such as a "C" programming language or a similar programming language.

Computer readable instructions may be provided to a processor of a general purpose computer, a special purpose computer, or other programmable data processing apparatus, or to programmable circuit, locally or via a local area network (LAN), wide area network (WAN) such as the Internet, and a computer readable instruction may be executed to provide means to perform operations specified in the described processing procedures or block diagrams. Examples of the processor include a computer processor, a processing unit, a microprocessor, a digital signal processor, a controller, a microcontroller, and the like.

While the embodiments of the present invention have been described, the technical scope of the present invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: vehicle
22: in-vehicle electronic system
27: hood switch
180: communication network
190: direct connection line
201: TCU
202: core ECU
210: first ECU
212: security state determination unit
214: alarm apparatus control unit
220: second ECU
230: third ECU
232: lighting body
240 fourth ECU
250: fifth ECU
271: hood switch
272: door switch
273: ultrasonic sensor
281: horn
282: security indicator
298: MID
2000 computer
2010 host controller
2012 CPU
2014: RAM
2020: input/output controller
2022: communication interface
2024: flash memory
2026: ROM
2040: input/output chip

What is claimed is:

1. An in-vehicle electronic system mounted to a vehicle, the in-vehicle electronic system comprising:
one or more sensors used to determine a security state of the vehicle, the one or more sensors being at least one of a door switch to output a signal indicating an open-close state of a door of the vehicle or a hood switch to output a signal indicating an open-close state of an engine hood of the vehicle;
an alarm apparatus configured to issue an alarm when the security state is abnormal; and
a first electronic control unit (ECU) that is a slave ECU connected to a core ECU and directly connected to the one or more sensors and the alarm apparatus without intermediation of any ECU, wherein
the first ECU is further connected to other slave ECUs and provided between the core ECU and the other slave ECUs, and has a gateway function for relaying communication between the core ECU and the other slave ECUs, and
the first ECU includes a processor configured to determine a security state based on at least information received from the one or more sensors, and cause the alarm apparatus to operate when the security state is determined to be abnormal.

2. The in-vehicle electronic system according to claim 1, further comprising:
a second ECU directly connected to the first ECU without intermediation of any ECU and configured to receive a locking signal and an unlocking signal based on an owner authentication result for the vehicle, wherein
the processor is configured to determine the security state further based on information received from the second ECU.

3. The in-vehicle electronic system according to claim 2, wherein
the one or more sensors include an ultrasonic sensor provided in the vehicle.

4. The in-vehicle electronic system according to claim 2, wherein
the alarm apparatus includes at least one of a horn and a security indicator.

5. The in-vehicle electronic system according to claim 2, further comprising:
a third ECU connected to the first ECU and configured to control a lighting body, wherein
the processor is configured to transmit a hazard output request to the third ECU when the security state is determined to be abnormal, and
the third ECU is configured to turn on in response to the hazard output request and also control the lighting body.

6. The in-vehicle electronic system according to claim 5, wherein
the alarm apparatus includes at least a horn, and
when the security state is determined to be abnormal, the processor is configured to cause the horn and the lighting body to alternately operate by alternately performing output of a signal for causing the horn to operate and transmission of the hazard output request to the third ECU.

7. The in-vehicle electronic system according to claim 1, wherein
the one or more sensors include an ultrasonic sensor provided in the vehicle.

8. The in-vehicle electronic system according to claim 7, wherein
the alarm apparatus includes at least one of a horn and a security indicator.

9. The in-vehicle electronic system according to claim 7, further comprising:
a third ECU connected to the first ECU and configured to control a lighting body, wherein
the processor is configured to transmit a hazard output request to the third ECU when the security state is determined to be abnormal, and
the third ECU is configured to turn on in response to the hazard output request and also control the lighting body.

10. The in-vehicle electronic system according to claim 1, wherein
the alarm apparatus includes at least one of a horn and a security indicator.

11. The in-vehicle electronic system according to claim 10, further comprising:
a third ECU connected to the first ECU and configured to control a lighting body, wherein
the processor is configured to transmit a hazard output request to the third ECU when the security state is determined to be abnormal, and
the third ECU is configured to turn on in response to the hazard output request and also control the lighting body.

12. The in-vehicle electronic system according to claim 1, further comprising:
a third ECU connected to the first ECU and configured to control a lighting body, wherein
the processor is configured to transmit a hazard output request to the third ECU when the security state is determined to be abnormal, and
the third ECU is configured to turn on in response to the hazard output request and also control the lighting body.

13. The in-vehicle electronic system according to claim 12, wherein
the alarm apparatus includes at least a horn, and
when the security state is determined to be abnormal, the processor is configured to cause the horn and the lighting body to alternately operate by alternately performing output of a signal for causing the horn to operate and transmission of the hazard output request to the third ECU.

14. A vehicle comprising the in-vehicle electronic system according to claim 1.

15. A control method executed, in an in-vehicle electronic system mounted to a vehicle, by a first electronic control unit (ECU) that is a slave ECU connected to a core ECU and directly connected to one or more sensors used to determine a security state of the vehicle and an alarm apparatus configured to issue an alarm when the security state is abnormal without intermediation of any ECU, the control method comprising:
determining a security state based on at least information received from the one or more sensors; and
causing the alarm apparatus to operate when the security state is determined to be abnormal, wherein
the one or more sensors are at least one of a door switch to output a signal indicating an open-close state of a door of the vehicle or a hood switch to output a signal indicating an open-close state of an engine hood of the vehicle, and
the first ECU is further connected to other slave ECUs and provided between the core ECU and the other slave ECUs, and has a gateway function for relaying communication between the core ECU and the other slave ECUs.

16. A non-transitory computer readable storage medium having stored thereon a program for causing, when executed, in an in-vehicle electronic system mounted to a vehicle, b a computer included in a first electronic control unit (ECU) that is a slave ECU connected to a core ECU and directly connected to one or more sensors used to determine a security state of the vehicle and an alarm apparatus configured to issue an alarm when the security state is abnormal without intermediation of any ECU, the computer to execute:
determining a security state based on at least information received from the one or more sensors; and
causing the alarm apparatus to operate when the security state is determined to be abnormal, wherein
the one or more sensors are at least one of a door switch to output a signal indicating an open-close state of a door of the vehicle or a hood switch to output a signal indicating an open-close state of an engine hood of the vehicle, and
the first ECU is further connected to other slave ECUs and provided between the core ECU and the other slave ECUs, and has a gateway function for relaying communication between the core ECU and the other slave ECUs.

\* \* \* \* \*